April 13, 1926.
J. VAN NORTWICK
1,580,351.
CORN HUSKING AND SHREDDING MACHINE
Filed Dec. 4, 1924   2 Sheets-Sheet 2
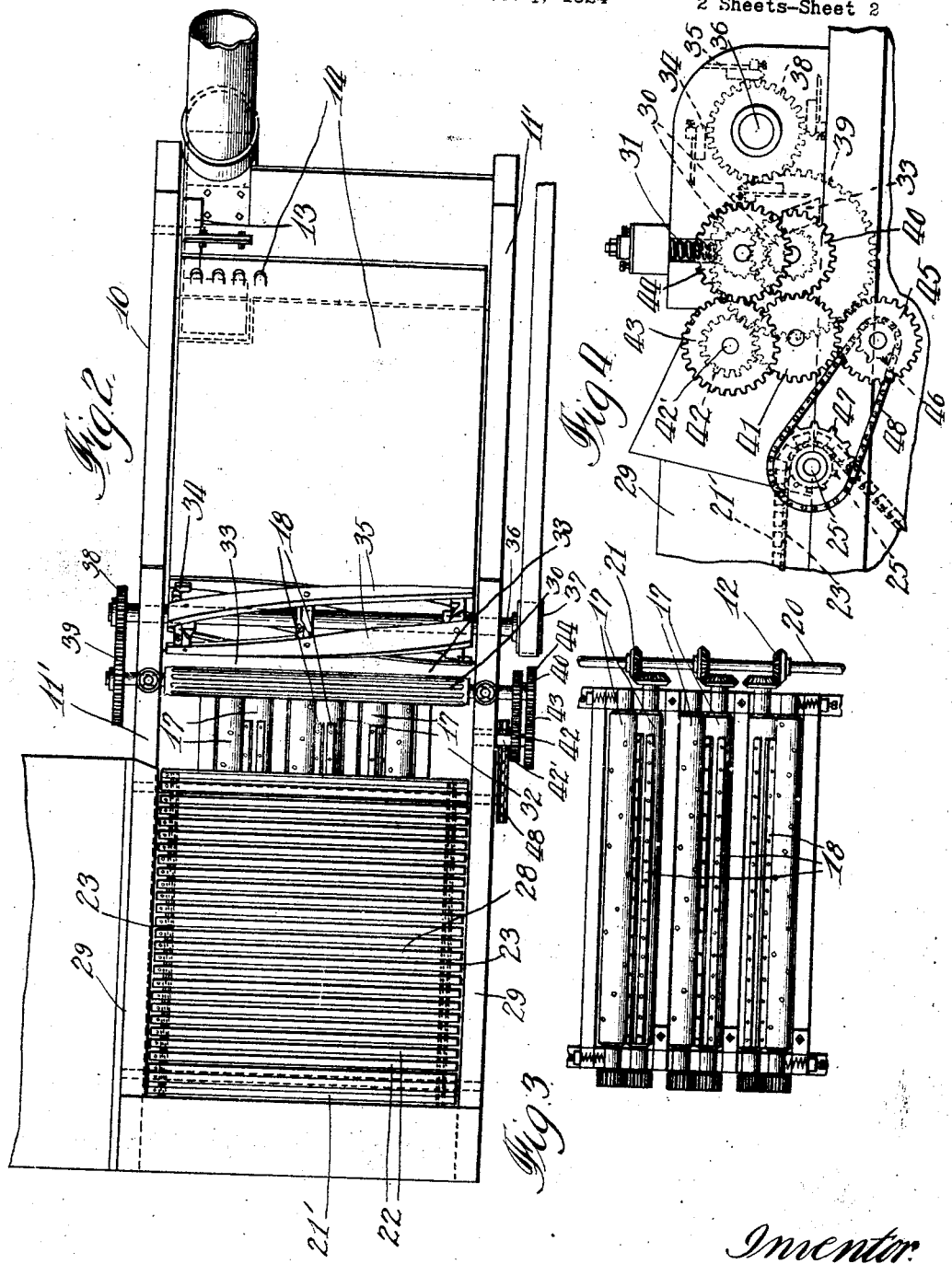
Inventor:
John Van Nortwick.
By Sprinkle & Smith
Attys Patented Apr. 13, 1926.

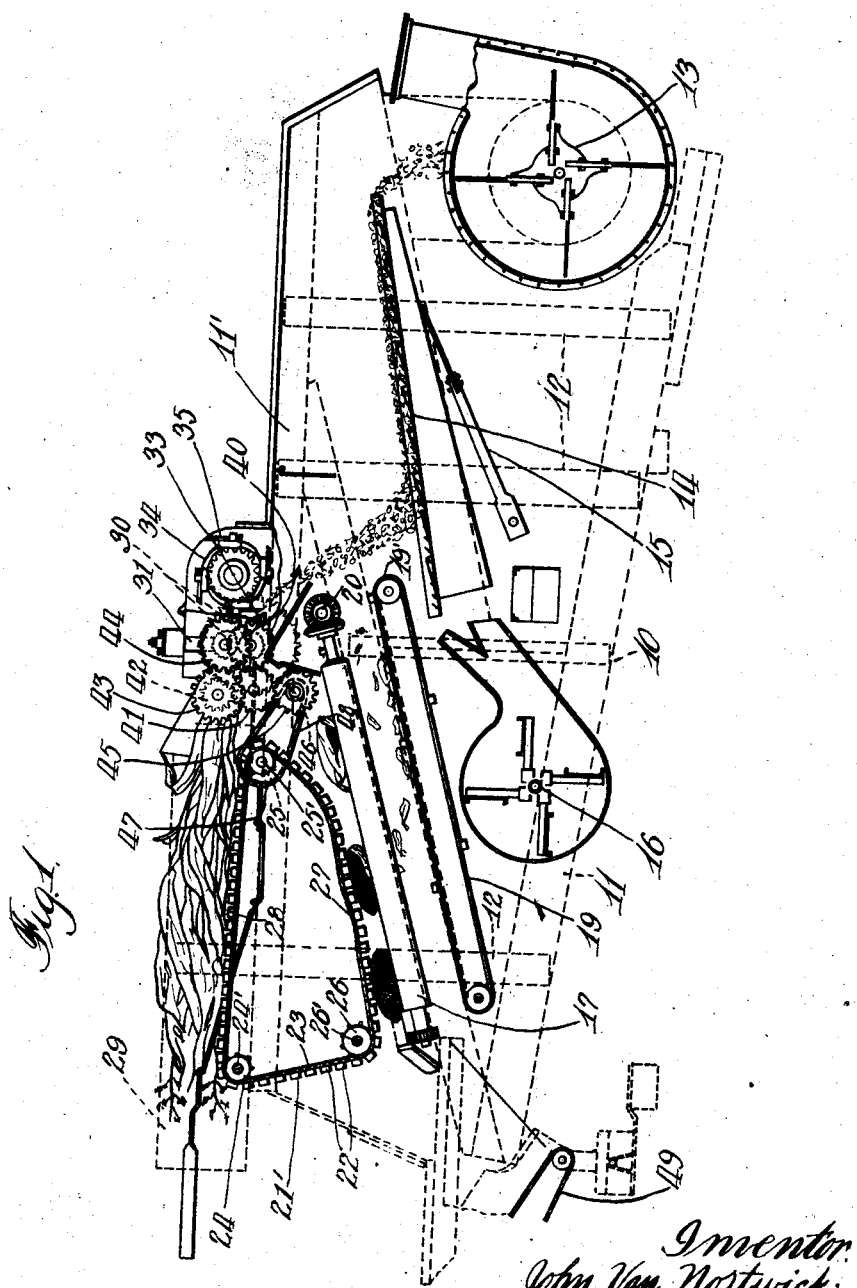

1,580,351

UNITED STATES PATENT OFFICE.

JOHN VAN NORTWICK, OF BATAVIA, ILLINOIS, ASSIGNOR TO APPLETON MANUFACTURING COMPANY, A CORPORATION OF ILLINOIS.

CORN HUSKING AND SHREDDING MACHINE.

Application filed December 4, 1924. Serial No. 753,760.

*To all whom it may concern:*

Be it known that I, JOHN VAN NORTWICK, a citizen of the United States, residing at Batavia, in the county of Kane and State of Illinois, have invented certain new and useful Improvements in Corn Husking and Shredding Machines, of which the following is a specification.

This invention relates to a corn husking and shredding machine.

One of the objects of the present invention is to provide an improved and simplified form of a husking and shredding machine.

A further object of the invention is to provide a construction of a husking and shredding machine in which one of the operative elements is arranged to perform two separate and distinct functions.

A further object of the invention is to provide an improved husking and shredding machine in which means are provided for conveying the stalks of corn to combination feeding and snapping rolls and the same means is employed to convey the ears of corn snapped from the stalks by the snapping rolls across the husking rolls.

These and other objects are accomplished by providing a construction and an arrangement of the various parts in the manner hereinafter described and particularly pointed out in the appended claims.

Referring to the drawings, Fig. 1 is a side elevational view of a husking and shredding machine partly in section showing my improvements mounted therein.

Fig. 2 is a top plan view of the husking and shredding machine shown in Fig. 1.

Fig. 3 is a top plan view of the husking rolls, and

Fig. 4 is a detail view of the power transmitting mechanism.

For the purpose of illustration I have shown the husking and shredding machine comprising a main frame generally indicated by the character number 10, which is made up of two main side frame members 11, upper side frame members 11' and vertical supporting post 12. The husking and shredding machine is mounted on the usual truck wheels, not shown, so that the same may be conveniently conveyed about. Mounted in the rearward end of the husking and shredding machine is a main blower fan 13 of any well known construction. Mounted forwardly of the main blower fan and inclined upwardly at an angle is a separator screen 14. The separator screen is reciprocally mounted within the main frame or housing of the husking and shredding machine and is adapted to be actuated by a pitman 15. Mounted forwardly of the reciprocating screen 14 and positioned adjacent the bottom of the husking and shredding machine is a cleaner fan 16. Extending longitudinally of the frame of the machine and inclined downwardly toward the front thereof are a plurality of husking rolls 17. The husking rolls are provided with husking blades 18 which extend longitudinally of the rolls for removing the husks from the ears. These husking rolls are mounted in pairs, as clearly shown in Fig. 3, and are operatively driven in pairs in a manner well known in the art. Positioned below the inclined husking rolls 17 and extending parallel to the husking rolls is an endless conveyor belt 19 which has its rear or delivery end 19' extending over the reciprocating screen 14 and is adapted to convey the husks which are removed from the ears of corn rearwardly on to the reciprocating screen 14. One of each pair of husking rolls 17 is operatively driven by a transversely extending shaft 20, which is provided with bevel gears 21, which in turn, are adapted to mesh with gears carried by one of each of the pairs of husking rolls, as shown in Fig. 3. The shaft 20 is operatively geared to one of the power shafts in any well known manner. The construction of the husking and shredding machine thus far described per se does not form any part of the invention excepting so far as they are a part of the combination.

The essential feature of my improved invention is the provision of a single operative element which is adapted to perform two separate and distinct functions in the operation of the machine. This improvement comprises an endless conveyor belt, generally referred to by the character number 21', which is made up of a plurality of transversely extending slats 22 and an endless chain 23 to which the slats are secured on the opposite sides. These chains 23 of the conveyor 21 are trained about forward sprockets 24 and rearward sprockets 25. The lower lap of the endless conveyor 21' is trained about idler sprockets 26 which are positioned below and spaced from the sprockets 24, as clearly shown in Fig. 1. The sprockets 26 are positioned adjacent the delivery or forward end of the husking rolls 17 in a manner to form sufficient space between the lower lap 27 of the endless conveyor 21' and the husking rolls 17 so that the ears of corn may be readily conveyed by the lower lap of the conveyor belt into the chute for delivery to the wagon or other receptacle.

It will of course, be understood that each of the pairs of sprockets 24, 25 and 26 are mounted on and secured to suitable shafts 24', 25' and 26', respectively, which, in turn, are mounted in suitable bearings secured to the opposite sides of the frame of the machine. The upper lap 28 of the endless conveyor belt 21 is arranged to travel in substantially a horizontal direction longitudinally of the machine and may be supported in any well known manner, as, for instance, by cleats secured to the opposite sides of the frame, which extend between the sprockets 24 and 25 in order to prevent this upper lap of the endless conveyor from sagging. Mounted on the opposite sides of the conveyor belt and extending slightly above the upper lap thereof are two side boards 29 which form substantially a trough with the conveyor for retaining the stalks of corn on the conveyer as they are being conveyed into the snapping and feeding rolls. Positioned adjacent the delivery end of the upper lap of the conveyor belt 21 and spaced a sufficient distance therefrom to permit the ears of corn to drop between them and the conveyor are two combined snapping and feeding rolls 30. These combined snapping and feeding rolls are preferably grooved so as to form ribs on their periphery in order to more aggressively engage the corn stalks for feeding them in the cutter head and at the same time snap the ears of corn from the stalks. These combined snapping and feeding rolls are mounted on bearings of any suitable form secured to the opposite sides of the machine. The bearings for the upper feed roll are preferably pressed down by compression springs 31 in order to yieldingly press the upper feed roll in contact with the lower feed roll so that these combined snapping and feeding rolls may adapt themselves for feeding greater or lesser amounts of corn stalks. When the ears of corn are snapped from the stalks by the combined snapping and feeding rolls 30 they drop downwardly in the opening 32 (see Fig. 2) between the delivery end of the conveyor and the snapping rolls 30 on to the inclined husking rolls 17 where the husks are removed by these rolls as the ears of corn are conveyed forwardly and downwardly by the lower lap 27 of the endless conveyor belt 21.

Mounted rearwardly of the combined snapping and feeding rolls 30 is a cutter bar 33 which is adapted to cooperate with a rotatable cylindrical cutter head 34, which is provided with a plurality of spirally arranged knives 35. As the stalks are fed in between the feed rolls 30 the revolving cutter head 34 co-operating with the cutter bar 33 cuts the stalks into fodder.

The power for operating my improved construction of a husking and shredding machine is derived through a shaft 36 on which the knife head 34 is mounted. This shaft is mounted in suitable bearings on the opposite sides of the machine. Secured to the shaft 36 on one side thereof is the usual belt pulley 37. Secured to the other end of the shaft 36 opposite the pulley 37 is a spur gear 38 which meshes with a spur gear 39 mounted on the lower snapping roll 30. Mounted on the lower feed roll 30 and secured to the end of the shaft of said feed roll opposite the spur gear 39 is a second spur gear 40. Meshing with the spur gear 40 and operatively driven thereby is an idler gear 41 which in turn meshes with a second idler gear 42. Formed integrally with the idler gear 42 or secured to a common shaft 42' is a relatively larger spur gear 43, which, in turn, meshes with a spur gear 44 secured to the shaft of the upper feed roll 30. It will, of course, be understood that the idler gears 41, 42 and 43 are mounted on suitable shafts journalled in bearings secured to the side of the machine. Positioned vertically below the idler gear 41 and operatively driven thereby is another idler gear 45 which has a sprocket 46 formed integrally therewith. The sprocket 46 is geared to a sprocket 47 by means of a chain 48. The sprocket 47 is secured to the shaft 25' which operatively drives the conveyor belt 21'. By this construction it will readily be seen that the power transmitting mechanism is so arranged for transmitting the power to the endless conveyor 21 that the upper lap 28 of the conveyor belt is held taut while the lower side or lap 27 is relatively slack so that it may readily engage the ears of corn and convey them over the husking rolls so that the husks may be removed and the ears conveyed to the elevator chute shown at 49 in Fig. 1, from where it is conveyed to suitable receptacles or wagons.

From the above description it will be readily understood that I have provided a simple and improved form of husking and shredding machine in which a single conveyor is adapted for conveying the stalks of corn placed thereon to combined snapping and feeding rolls in which the ears are snapped off and the stalks fed into a cutting mechanism and where another portion of the same conveying mechanism is utilized for conveying the ears of corn snapped by the snapping rolls across the husking rolls into a delivery chute or elevator. It is quite obvious of course that separate and independent conveying elements might readily be provided, such, for instance, as separate and independently operated conveyor belts for each pair of snapping rolls wherein the double function of feeding the stalks to the feeding rolls and conveying the ears of corn over the husking rolls may be accomplished by each individual and separate conveying element. Such variation in structure it will of course be understood will come within the scope of my invention as defined by the claims.

While in the above specification I have described one embodiment which my invention may assume in practice, it will of course, be understood that the same is capable of modification and that modification may be made without departing from the spirit and scope of the invention as expressed in the following claims.

What I claim as my invention and desire to secure by Letters Patent is:

1. A corn husking and shredding machine, comprising a frame, a plurality of snapping and feeding rolls mounted thereon, a plurality of husking rolls mounted on said frame adjacent said snapping and feeding rolls, and a single operative element mounted on said frame for conveying stalks of corn to said snapping and feeding rolls and for pressing the ears of corn against said husking rolls.

2. A corn husking and shredding machine, comprising a frame, a plurality of snapping and feeding rolls mounted thereon, a plurality of husking rolls mounted on said frame adjacent said snapping and feeding rolls, and an endless conveyor mounted on said frame for conveying stalks of corn to said snapping and feeding rolls and for pressing the ears of corn against said husking rolls.

3. A corn husking and shredding machine, comprising a frame, a plurality of snapping and feeding rolls mounted thereon, a plurality of husking rolls mounted on said frame adjacent said snapping and feeding rolls, and an endless conveyor belt having one lap thereof for conveying the stalks of corn to said snapping and feeding rolls and the other lap thereof for pressing the ears of corn against said husking rolls while they are being conveyed over said husking rolls.

4. A corn husking and shredding machine, comprising a frame, a plurality of snapping and feeding rolls mounted thereon, a plurality of husking rolls mounted on said frame adjacent said snapping and feeding rolls, and an endless conveyor belt having the upper lap thereof for conveying the stalks of corn to said snapping and feeding rolls and the lower lap thereof for pressing the ears of corn against said husking rolls.

5. A corn husking and shredding machine comprising a frame, a plurality of rolls mounted transversely on said frame for feeding stalks of corn into said machine and for snapping ears of corn off the corn stalks, a plurality of husking rolls arranged longitudinally of said frame and below said first named roller, and a single operable element movable longitudinally of said frame for conveying corn stalks into said first named rolls and for conveying the ears of corn over and pressing the ears of corn against said husking rolls.

6. A corn husking and shredding machine comprising a frame, a plurality of rolls mounted transversely on said frame for feeding stalks of corn into said machine and for snapping ears of corn off the corn stalks, a plurality of husking rolls arranged longitudinally of said frame and below said first named roller, and an endless belt conveyor mounted on said frame and adapted to travel in a direction longitudinally of said machine for conveying the stalks of corn into said first named rolls and for conveying the ears of corn over and holding the ears of corn in pressed relation with said husking rolls.

7. A corn husking and shredding machine comprising a frame, a plurality of combined snapping and feeding rolls mounted transversely in said frame, a plurality of husking rolls positioned longitudinally in said frame and inclined downwardly toward the front of said machine, and an endless belt conveyor having one lap thereof arranged to travel in a horizontal plane for conveying stalk into said snapping rolls, and another lap thereof adapted to travel substantially parallel with said husking rolls for conveying the ears of corn snapped from the stalks by said snapping rolls over and pressing the ears of corn in engagement with said husking rolls.

8. A corn husking and shredding machine comprising a frame, a plurality of combined snapping and feeding rolls mounted transversely in said frame, a plurality of husking rolls positioned longitudinally in said frame and inclined downwardly toward the front of said machine, and an endless belt conveyor mounted in said frame and trained about three spaced apart sprockets whereby the upper lap of the conveyor travels in substantially a horizontal plane for conveying corn stalks into said snapping and feeding rolls and the lower lap travels in a plane substantially parallel to said husking rolls for conveying the ears of corn over and in pressed engagement with said husking rolls.

In testimony whereof I have signed my name to this specification on this 29th day of Nov., A. D. 1924.

JOHN VAN NORTWICK.